United States Patent
Kim et al.

(10) Patent No.: US 6,876,538 B1
(45) Date of Patent: Apr. 5, 2005

(54) DIELECTRIC COMPOSITION FOR MULTILAYER CERAMIC CAPACITOR, MULTILAYER CERAMIC CAPACITOR, AND METHOD FOR MANUFACTURING MULTILAYER CERAMIC CAPACITOR

(75) Inventors: Jong Han Kim, Kyungki-do (KR); Kang Heon Hur, Kyungki-do (KR); Woo Sup Kim, Kyungki-do (KR); Joon Hee Kim, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/852,424

(22) Filed: May 25, 2004

(30) Foreign Application Priority Data

Dec. 18, 2003 (KR) ................. 10-2003-0093145

(51) Int. Cl.$^7$ ................. H01G 4/06; C04B 35/468; C03B 29/00
(52) U.S. Cl. ................. 361/321.4; 361/311; 501/139; 156/89.12
(58) Field of Search ................. 361/321.1, 321.2, 361/321.3, 321.4, 321.5, 311; 501/137–139; 156/89.12

(56) References Cited

U.S. PATENT DOCUMENTS 6,777,363 B2 * 8/2004 Park et al. ................. 501/139
6,809,052 B2 * 10/2004 Horie et al. ................. 501/138
2004/0106510 A1 * 6/2004 Kim et al. ................. 501/139

FOREIGN PATENT DOCUMENTS

| JP | 57-71866 | 5/1982 |
| JP | 61-36170 | 2/1986 |
| JP | 61-250905 | 11/1986 |
| JP | 03-133116 | 6/1991 |
| JP | 2000-311828 | 11/2000 |

* cited by examiner

Primary Examiner—Eric Thomas
(74) Attorney, Agent, or Firm—Lowe Hauptman & Berner, LLP

(57) ABSTRACT

Disclosed herein are a multilayer ceramic capacitor, a dielectric composition capable of sintering at a lower temperature and having a small variation in dielectric constant, a multilayer ceramic capacitor using the same, and a method thereof. The dielectric composition includes $BaTiO_3$, $MgCO_3$, $Y_2O_3$, $Cr_2O_3$, $Mn_2V_2O_7$, and $xBaO \cdot yZrO_2 \cdot zSiO_2$ acting as a sintering agent (where $0.1 \leq x \leq 0.3$, $0.1 \leq y \leq 0.3$ and $0.4 \leq z \leq 0.8$, $x+y+z=1$), wherein when representing the composition with the formula $aBaTiO_3$-$bMgCO_3$-$cY_2O_3$-$dCr_2O_3$-$e(Mn_2V_2O_7)$-$f(xBaO$-$yZrO_2$-$zSiO_2)$, the ratio of the components satisfies the conditions of $a=100$, $0.1 \leq b \leq 3.0$, $0.3 \leq c \leq 2.0$, $0.05 \leq d \leq 0.2$, $0.01 \leq e \leq 1.5$, $0.5 \leq f \leq 3.0$ based on the molar ratio. When manufacturing a multilayer ceramic capacitor of a higher capacitance, which is formed to have the thin layer structure of 4 μm or less, short circuits between internal electrodes and the deterioration in capacitance due to massing of the electrodes into ball at the ends may be remarkably reduced.

16 Claims, 1 Drawing Sheet

DIELECTRIC COMPOSITION FOR MULTILAYER CERAMIC CAPACITOR, MULTILAYER CERAMIC CAPACITOR, AND METHOD FOR MANUFACTURING MULTILAYER CERAMIC CAPACITOR

CROSS-REFERENCE TO RELATED APPLICATION

This application claims to benefit of Korea Patent application No.2003-93145 filed 18, Dec. 2003 in the Korea Intellectual Property Office, and the disclosure of which is incorporated herein by reference.

BACKGROUND OF THE INVENTION

1. Field of the Invention

The present invention relates to a dielectric composition for a multilayer ceramic capacitor, a multilayer ceramic capacitor and a method for manufacturing the multilayer ceramic capacitor, and more particularly to a dielectric composition for a multilayer ceramic capacitor in which its dielectrics are formed to have a thin layer structure, a multilayer ceramic capacitor using the dielectric composition, and a method for manufacturing the multilayer ceramic capacitor.

2. Description of the Related Art

Recently, there has been an increasing trend toward high integration, miniaturization and weight reduction of components in the electronic industry.

As for a multilayer ceramic capacitor, a higher capacitance and a smaller size thereof have also been strongly pursued, along with securing an excellent heat resistance and a good reliability.

Such a multilayer ceramic capacitor is generally prepared through sintering after lamination of a dielectric slurry and paste of internal electrodes, for example, using a sheet process and a printing process.

As for internal electrodes, Ni or Ni alloys are preferred due to their lower price, although Pd or Pd alloys have been generally used.

In case of forming such internal electrodes with Ni or Ni alloys, there is a problem of oxidation of the electrodes when sintering in the atmosphere.

Thus, after a de-binder process, the inner electrodes are generally sintered at a partial pressure of oxygen lower than the equilibrium partial pressure of oxygen under the atmosphere of Ni and NiO, and the dielectric layers are re-oxidized by heat treatment thereafter (Japanese Patent Laid-open Publication No.(Hei)3-133116).

However, sintering under a reducing atmosphere causes reduction of the dielectric layers and a reduction in specific resistance.

Thus, there is proposed a reduction resistant dielectric composition that is not reduced after being sintered under a reducing atmosphere.

However, the multilayer ceramic capacitors using the reduction resistant dielectric material have problems in that the accelerated life of insulation resistance (IR) under a higher temperature and the reliability thereof are deteriorated.

Further, there is another problem of lowering of the relative dielectric constant of the dielectric layer with the passage of time, particularly remarkable under the direct current.

In order to provide a multilayer ceramic capacitor with a higher capacitance and a smaller size, it is necessary to provide a thinner dielectric layer.

In case of forming a thinner dielectric layer, an increase in the electric field strength under the direct current is involved.

Thus, the variation with the passage of time in the relative dielectric constant becomes remarkable.

As for materials for the dielectrics having the X7R characteristics regulated in EIA standard, for example, Japanese Patent Laid-open Publication No.(Sho)61-36170 discloses $BaTiO_3+SrTiO_3+MnO$-based composition.

In order to provide the X7R characteristics, the variation in capacitance should be within ±10% (at the reference temperature of 25° C.) at a temperature of −55° C.~125° C.

However, the $BaTiO_3+SrTiO_3+MnO$-based composition exhibits a great variation in capacitance with the passage of time under the direct current electric fields. For example, in case of applying a direct current of 50 V at 40° C. for 1000 hours, the variation in capacitance approaches 10% to −30%, thereby not satisfying the X7R characteristics.

Further, in accordance with the B property (EAIJ standard) which is temperature characteristics of capacitance, the variation in capacitance is defined to be within ±10% (at a reference temperature of 20° C.) at a a of between −25° C. and 85° C.

Further, as for other dielectric ceramic composition having the reduction resistance, Japanese Patent Laid-Open Publication No.(Sho)57-71866 discloses $BaTiO_3+MnO+MgO$-based compositions.

However, if the dielectric layer with any of the dielectric ceramic compositions mentioned above is formed to have an ultra thin layer structure having, for example, a thickness of 4 μm or less, all properties, such as temperature characteristics of capacitance, variation in capacitance with the passage of time under the direct current electric fields, accelerated life of insulation resistance, deterioration in capacitance under the direct current bias, etc., cannot be satisfied concurrently.

For example, the dielectric ceramic compositions disclosed in Japanese Patent Laid-open Publications No.(Sho) 61-250905 has problems of a reduction in the accelerated life of insulation resistance or a serious deterioration in capacitance under the direct current bias.

In order to overcome the problems as disclosed above, Japanese Patent Laid-open Publication No. 2000-311828 discloses a method for manufacturing a dielectric ceramic composition and a method for manufacturing an electronic component having dielectric layers.

In accordance with Japanese Patent Laid-Open Publication No. 2000-311828, the dielectric ceramic composition comprises at least a main component represented by the formula $Ba_mTiO_{2+n}$ where $0.995 \leq m \leq 1.010$, $0.995 \leq n \leq 1.010$ and $0.995 \leq Ba/Ti \leq 1.010$ based on the molar ration, a subcomponent which is a sintering agent mainly comprising silicone oxide, and other subcomponents. The method of the invention comprises the steps of: preparing powder which is not binder-burnt out by mixing the main component and at least a part of other subcomponents except the subcomponent, preparing a binder-burnt out powder by binder-burning out the non binder-burnt out powder, and preparing a dielectric ceramic composition having a predetermined molar ratio of the respective subcomponents to the main component by at least mixing the binder-burnt out powder with the secondary subcomponent.

As for subcomponents in the above dielectric ceramic composition, the proposed is MgO, CaO, BaO, SrO and $Cr_2O_3$; $(Ba, Ca)_xSiO_{2+x}(x=0.8\sim1.2)$; $V_2O_5$, $MoO_3$ and $WO_3$; R(which is at least one element selected from Y, DY, Th, Gd and Ho).

The dielectric ceramic composition as discussed above has advantages of a lower variation with the passage of time and a lower reduction in capacitance under the direct current electric fields, and of a longer accelerated life of insulation resistance.

However, since the above composition must be sintered at a temperature of about 1300° C., it has a problem in that it cannot be applied to the dielectrics for a capacitor having a superior capacitance, which is formed to have the thin layer structure of a thickness of 4 μm or less.

That is, in case of using the composition as a dielectric material for a multilayer ceramic capacitor having a higher capacitance, in which Ni internal electrodes are disposed between dielectric layers, when sintering the dielectric layers and Ni internal electrodes concurrently, the Ni internal electrodes shrink earlier than the dielectric layers at a low temperature due to their lower sintering temperature. De-lamination occurs between the layers and the internal electrodes are massed into ball at their ends, thereby causing a short circuit.

SUMMARY OF THE INVASION

Therefore, it is an object of the present invention to provide a dielectric composition satisfying the X5R characteristics and capable of being sintered at a lower temperature.

It is a further object of the present invention to provide a dielectric composition satisfying the X5R characteristics in which the variation in the dielectric constant depending on temperature is low.

It is yet another object of the present invention to provide a multilayer ceramic capacitor using the above dielectric composition and a method for manufacturing the multilayer ceramic capacitor.

In accordance with an aspect of the present invention, the above and other objects can be accomplished by the provision of a dielectric composition for a multilayer ceramic capacitor, the composition comprising $BaTiO_3$, $MgCO_3$, $Y_2O_3$, $Cr_2O_3$, $Mn_2V_2O_7$, and $xBaO$-$yZrO_2$-$zSiO_2$ serving as a sintering additive (where $0.1 \leq x \leq 0.3$, $0.1 \leq y \leq 0.3$ and $0.4 \leq z \leq 0.8$, $x+y+z=1$), wherein when representing the composition with the formula $aBaTiO_3$-$bMgCO_3$-$cY_2O_3$-$dCr_2O_3$-$e(Mn_2V_2O_7)$-$f(xBaO$-$yZrO_2$-$zSiO_2)$, the ratio of the components satisfies the conditions of $a=100$, $0.1 \leq b \leq 3.0$, $0.3 \leq c \leq 2.0$, $0.05 \leq d \leq 0.2$, $0.01 \leq e \leq 1.5$, $0.5 \leq f \leq 3.0$ based on the molar ratio.

In accordance with another aspect of the present invention, there is provided a multilayer ceramic capacitor alternately laminated with internal electrodes and dielectric layers, wherein the dielectric layers comprise a dielectric composition for a multilayer ceramic capacitor having the following formula:

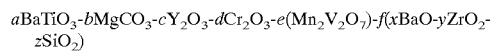

(where $a=100$, $0.1 \leq b \leq 3.0$, $0.3 \leq c \leq 2.0$, $0.05 \leq d \leq 0.2$, $0.01 \leq e \leq 1.5$, $0.5 \leq f \leq 3.0$, $0.1 \leq x \leq 0.3$, $0.1 \leq y \leq 0.3$, $0.4 \leq z \leq 0.8$, $x+y+z=1$ based on the molar ratio)

In accordance with yet another aspect of the present invention, there is provided a method for manufacturing a multilayer ceramic capacitor, the method comprising the steps of:

printing internal electrodes on dielectric sheets;
laminating the dielectric sheets on which the internal electrodes are printed; and
sintering the laminated dielectric sheets,
wherein the dielectric sheets comprise a dielectric composition having the following formula:

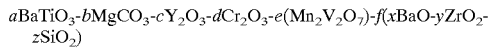

(where $a=100$, $0.1 \leq b \leq 3.0$, $0.3 \leq c \leq 2.0$, $0.05 \leq d \leq 0.2$, $0.01 \leq e \leq 1.5$, $0.5 \leq f \leq 3.0$, $0.1 \leq x \leq 0.3$, $0.1 \leq y \leq 0.3$, $0.4 \leq z \leq 0.8$, $x+y+z=1$ based on the molar ratio)

BRIEF DESCRIPTION OF THE DRAWINGS

The above and other objects, features and other advantages of the present invention will be more clearly understood from the following detailed description taken in conjunction with the accompanying drawing.

DESCRIPTION OF THE PREFERRED EMBODIMENTS

Figure 1:
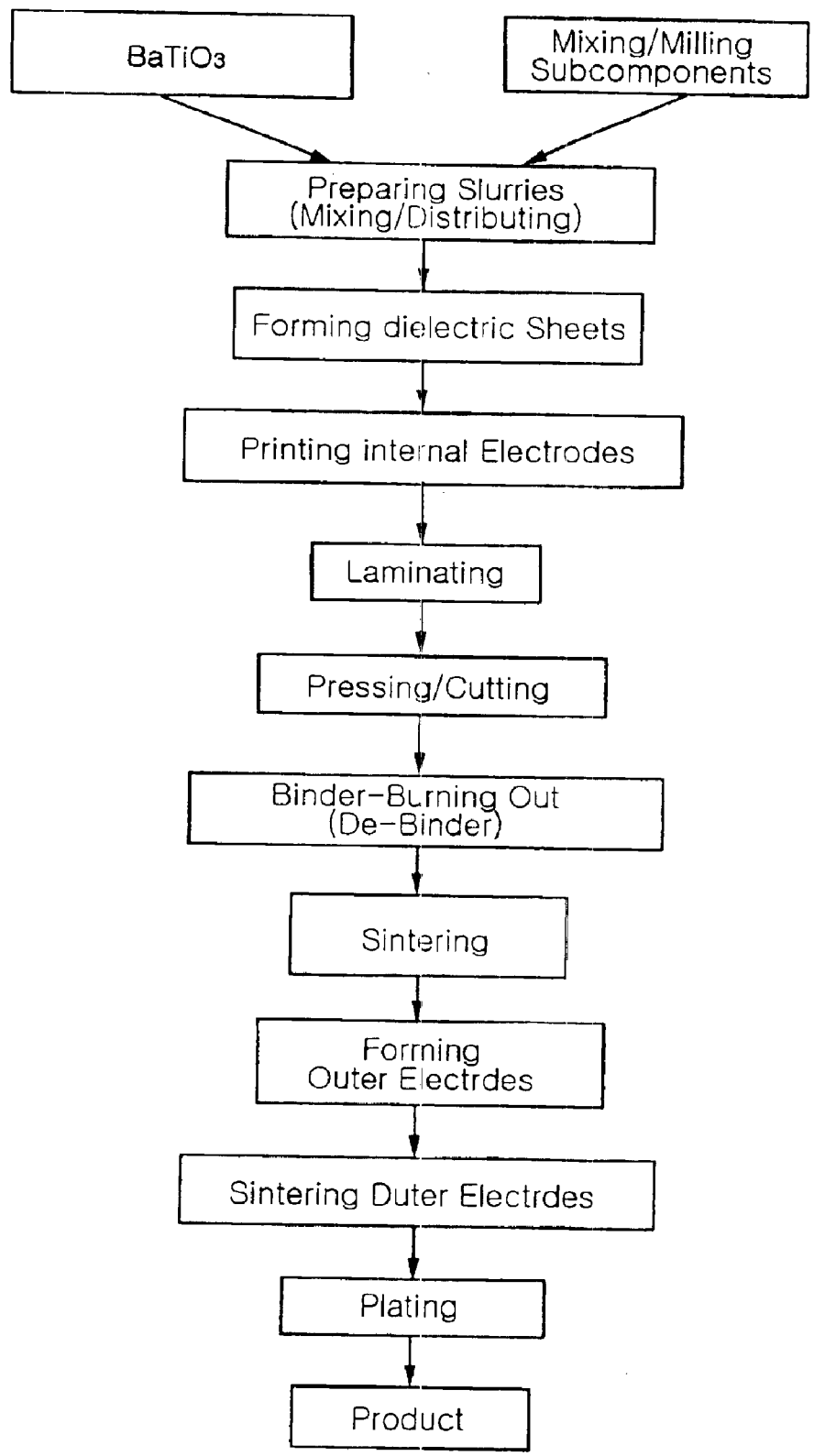
FIG. 1 is a flow chart illustrating a method for manufacturing a multilayer ceramic capacitor in accordance with the present invention.

The present invention will now be described in the following.

In order to provide a multilayer ceramic capacitor having a higher capacitance, dielectric layers should be laminated to have a multilayer structure.

For example, in order to make a multilayer ceramic capacitor having a superior capacitance in which 10 μF can be obtained in a commercially available 2012 (2.0 mm×1.25 mm) size or less, three hundred or more dielectric layers of a thickness of 2~4 μm or less should be laminated.

As a result, in order to secure a higher capacitance in such a laminated dielectric layer structure, dielectric layers should be formed to have a thin layer structure.

As the dielectric is formed to have a thin layer structure, internal electrodes are ready to be massed into the ball when sintering at a high temperature of 1300° C. or more to cause a deterioration in capacitance and an increase of short circuits.

Further, as the dielectrics are formed to have the thin layer structure and are highly laminated for achieving the higher capacitance, detrimental effects on the capacitance are caused at a high temperature.

The present invention provides a reduction resistant dielectric composition sintered at a lower temperature, which satisfies the temperature characteristics of capacitance of the X5R characteristics (where $\Delta C/C$ 25° C. is within ±15% at −55° C.~85° C.) regulated in EIA standard by an addition of a suitable amount of sintering agent comprising the components particularly composed, and which can be sintered concurrently with internal electrodes at relatively lower temperatures of 1230° C. or less, preferably of 1170° C.~1230° C.

In general, multilayer ceramic capacitors are classified on the basis of the temperature dependent characteristics of capacitance.

As classified in accordance with the above reference, $\Delta C$ for a multilayer ceramic capacitor with the X5R characteristics is within ±15% at −55° C.~85° C., while $\Delta C$ for a multilayer ceramic capacitor with the X7R characteristics is within ±15% at −55° C.~125° C.

The grain size of the dielectrics in the multilayer ceramic capacitor should be almost the same as that of $BaTiO_3$ as a starting material. An excessive grain growth will cause collapse of the core-shell structure that is a basic structure for the dielectrics having the X7R or the X5R characteristics, a rapid increase of the dielectric constant up to the grain size of 0.7 μm~1.0 μm, and a deterioration in the temperature characteristics of capacitance.

Thus, it is advantageous that the grain size thereof is maintained in the range of 0.2 μm~0.4 μm to achieve an excellent temperate characteristics.

$MgCO_3$ in the composition substitutes for Ti in $BaTiO_3$ as a subcomponent, and acts to form the core-shell structure that is the basic structure for the dielectrics having the X7R or the X5R characteristics.

Specifically, Mg in $MgCO_3$ diffuses toward the center of the pure $BaTiO_3$, at which the core is created at 950° C. or more, so that it acts to restrain the entrance of the other subcomponents into the core.

Preferably, $MgCO_3$ is added to the composition in the range of $0.1 \leq b \leq 3.0$ based on the molar ratio. If b is less than 0.1, the particle growth of $BaTiO_3$ is not restrained thus causing an excessive grain growth, thereby deteriorating the temperature characteristics of capacitance for an increase of the reduction rate of capacitance at a higher temperature part of 85° C. or more. If b is more than 3.0, the mass flow is restrained causing deterioration of the sintering property and the accelerated life.

$Y_2O_3$ can substitute for Ba in $BaTiO_3$, thereby enhancing the accelerated life and serving to flatten the temperature characteristics at the highr temperature part by enhancing the temperature variation in capacitance at the higher temperature part at 85° C. or more.

Preferably, $Y_2O_3$ is added to the composition in the range of $0.3 \leq d \leq 2.0$ based on the molar ratio. If c is less than 0.3, the accelerated life rapidly deteriorates, while if c is more than 2.0, the capacitance and the sintering property deteriorate.

$Cr_2O_3$ acts to enhance the reduction resistance and the sintering property.

Preferably, the content of $Y_2O_3$ is in the range of $0.05 \leq d \leq 0.2$ based on the molar ratio.

If the added amount of $Cr_2O_3$ is less than 0.05, the sintering property of $BaTiO_3$ deteriorates, while if the added amount thereof is more than 0.2, the insulation resistance deteriorates. Thus, the content of $Cr_2O_3$ is preferably in the range of $0.05 \leq d \leq 0.2$ based on the molar ratio.

$Mn_2V_3O_7$ has a lower melting point of about 820° C. It acts to promote the sintering property of the dielectric ceramic composition and to lower the sintering temperature.

If $Mn_2V_3O_7$ is added to the dielectric ceramic composition, it is possible to lower the amount of the subcomponent additive in the state of glass acting as the sintering agent, thereby enhancing the dielectric constant.

Further, $Mn_2V_3O_7$ tends to flatten the temperature characteristics of capacitance above the Curie temperature and has an effect of enhancing insulation resistance.

V in $Mn_2V_3O_7$ also acts to enhance the reliability of the composition.

Preferably, the added amount of $Mn_2V_3O_7$ is adjusted to be in the range of $0.01 \leq e \leq 1.5$. If the added amount is less than 0.01, it fails to achieve sufficient effects as described above, whereas if the added amount is more than 1.5, deterioration of insulation resistance and bad influences on the temperature characteristics of capacitance will occur.

A $(xBaO-yZrO_2-zSiO_2)$-based composition acting as a sintering agent is an especially important component and acts to reduce the sintering temperature of the dielectrics. Preferably, the added amount thereof is adjusted to be in the range of $0.5 \leq f \leq 3.0$ based on the molar ratio.

If the added amount of the sintering agent is lower than 0.5, the sintering property deteriorates and the temperature characteristics of capacitance at the high temperature part at 85° C. or more deteriorate, thereby not satisfying the EIA property. If the added amount thereof is more than 3.0, the relative dielectric constant of the dielectrics rapidly decreases and the sintering is rapidly progressed to cause the grain growth. Thus, preferably, the added amount of the $(xBaO-yZrO_2-zSiO_2)$-based composition is adjusted to be in the range of $0.5 \leq f \leq 3.0$ based on the molar ratio.

In accordance with the present invention, the addition of the sintering agent, that is, the $(xBaO-yZrO_2-zSiO_2)$-based composition will cause a remarkable lowering of the sintering temperatures from 1280° C. or more to 1230° C. or less.

BaO in the sintering agent is a component that acts to stabilize the temperature characteristics of capacitance by making the ratio of Ba/Ti in $BaTiO_3$ to be 1 or more.

Preferably, the added amount of BaO is adjusted to be in the range of $0.1 \leq x \leq 0.3$ based on the molar ratio. If the added amount is less than 0.1, it will fail to achieve sufficient effects, whereas if the added amount is more than 3.0, the sintering temperature will rise.

$ZrO_2$ is a component that acts to enhance the temperature characteristics of capacitance by increasing the capacitance at the high temperature part.

Preferably, the added amount of $ZrO_2$ is adjusted to be in the range of $0.1 \leq y \leq 0.3$ based on the molar ratio. If the added amount is less than 0. 1, it will fail to achieve sufficient effects, whereas if the added amount is more man 0.3, the sintering property will deteriorate.

$SiO_2$ is a main component in the sintering agent, and is preferably adjusted to be in the range of $0.4 \leq z \leq 0.8$ based on the molar ratio.

More preferably, the sintering agent is added with the particle size of 1 μm or less (in the reference of D100) after milling.

In case of adding the sintering agent with the particle size of 1 μm or less, uniform grains after sintering and an excellent sintering property are obtained. Further, for the product with the dielectric layers of 1~3 μm of the higher capacitance after sintering, the accelerated life and the short circuit property can be enhanced.

The sintering agent having the particle size of 1 μm or more will provide the dielectric layers of 4 μm or less to cause lowering of the reliability of the multilayer ceramic capacitor with the dielectric layers of 2 μm or less after sintering. Further, the dielectric layers of 4 μm or less therefrom may be often melt in local parts during sintering, whereby segregations occur resulting in abnormal grain growth, which cause deterioration of the dielectric constant thereof.

The addition of the $(xBaO-yZrO_2-zSiO_2)$-based composition, which is the sintering agent, can be applied either in the state of glass or calcination, more preferably in the state of glass.

Further, by forming dielectric layers of a multilayer ceramic capacitor with the dielectric compositions in accordance with the present invention, the present invention provides a multilayer ceramic capacitor in which the short circuit does not occur even in the products having a higher capacitance.

Typically, the multilayer ceramic capacitor is prepared by alternately laminating the internal electrodes and the dielectric layers.

In the multilayer ceramic capacitor of the present invention, each dielectric layer comprises the dielectric composition for the multilayer ceramic capacitor of the present invention as discussed above.

As for the internal electrodes, Ni electrodes are preferably used.

An example of the method for manufacturing the multilayer ceramic capacitor in accordance with the present invention will be described as follows.

FIG. 1 shows an example of the method for manufacturing the multilayer ceramic capacitor in accordance with the present invention.

Referring to FIG. 1, it is necessary to prepare the dielectric composition in accordance with the present invention.

Although the method for manufacturing the ($xBaO$-$yZrO_2$-$zSiO_2$)-based composition acting as the sintering agent constituting the dielectric composition is not particularly limited, it is preferable to provide as follows.

In order to prepare the ($xBaO$-$yZrO_2$-$zSiO_2$)-based composition having the state of glass in the sintering agent, after the respective components thereof are weighed, they are melted at temperatures between 1300° C. and 1400° C., quenched and subjected to a primary dry milling. Then, they are secondarily milled through a wet milling process with Ethyl alcohol, thereby providing the resultant.

The secondary milling process is preferably applied so as to provide the particle size of 1.0 $\mu$m or less in D100.

The ($xBaO$-$yZrO_2$-$zSiO_2$)-based composition having the state of calcination in the sintering agent is prepared through milling after a calcining process at temperatures between 800° C.~1000° C. for about 3 hours.

Meanwhile, the subcomponents in the dielectric composition are individually weighed and mixed with the main component, that is, $BaTiO_3$ through a wet mixing process using pure alcohol or Ethyl alcohol. Then, they are milled through a milling process.

In wet mixing and milling, preferably, the particle sizes thereof are in the range of 0.3 $\mu$m~0.4 $\mu$m in D50 or 1.0 $\mu$m or less in D100.

The mixed and milled subcomponents are dried, preferably at a temperature of 100° C. or higher for 5 hours or longer.

The subcomponents and the ($xBaO$-$yZrO_2$-$zSiO_2$)-based composition acting as the sintering agent prepared as described above are added to $BaTiO_3$, mixed and distributed.

The particle size of $BaTiO_3$ is preferably in the range of 0.2 $\mu$m~0.4 $\mu$m.

Meanwhile, in the processes of mixing and distributing, under the condition that $BaTiO_3$ as a starting material is not milled, they are deagglomerated and distributed to the maximum level with a distributing agent and the solvent which is provided by mixing toluene and ethanol.

The condition is based on the fact that the particle size of $BaTiO_3$ and the grain size after sintering have a great effect on electric properties.

After the distribution as described above, in order to form sheets, the slurries thereof are prepared through mixing with organic binder added thereto.

In order to remove bubbles therein and stabilize the slurries, the slurries are subjected to an aging treatment for a suitable period of time. Then, the slurries are applied onto films to provide the dielectric sheets by a forming process.

Preferably, the sheets have a thickness of about 4 $\mu$m or less.

The dielectric sheets prepared as described above are laminated after being printed with internal electrodes.

Ni electrodes are preferred as the internal electrodes.

For example, in order to obtain 10 $\mu$F or more with the size of 2012 (2.0 mm×1.25 mm) or less using the dielectric sheets, three hundred or more dielectric layers should be laminated.

Subsequently, the laminated sheets are pressed using the CIP (Cold Isostatic Press) process and are cut.

The press process using the CIP process may be applied at 85° C.~100° C., 800~1000 kg/cm$^2$ for 10~14 minutes.

The laminated dielectric sheets cut as described above are binder-burnt out to remove the organic binder and the distributing agent.

The binder-burnt out process is preferably applied at 250° C.~350° C. for 20 hours or more.

After the de-binder treatment using the binder-burn out process, the laminated dielectric sheets are sintered in a sintering furnace capable of adjusting the temperatures and the atmosphere therein.

Preferably, the sintering temperature is in the range of 1170° C.~1230° C. and the partial pressure of oxygen in the sintering atmosphere is in the range of $10^{-11}$~$10^{-12}$ atm.

Next, outer electrodes are prepared on the dielectric elements that are subjected to the sintering process.

Applied with the outer electrodes, preferably Cu outer electrodes, the dielectric elements may be formed through sintering on the electrodes at 850° C.~920° C.

After sintering the outer electrodes as mentioned above, plating is applied thereto, thereby providing the products.

In accordance with the method of the present invention, there is a provision of a multilayer ceramic capacitor having a higher capacitance, which is formed into thinner layers of 4 $\mu$m or less, preferably of 2 $\mu$m~4 $\mu$m, in which short circuits caused by massing of the internal electrodes and cracks between the electrodes are not generated, and the X5R characteristics (EIA standard: $\Delta C=\pm15\%$, at −55~85° C.) are also basically satisfied.

The present invention will be specifically described with reference to the following embodiment.

EXAMPLE

A sintering agent in the state of glass with the components shown in following Table 1 was prepared.

In Table 1, Invented Samples G1 and G2, and Comparative Samples G1 and G2 are the ($xBaO$-$yZrO_2$-$zSiO_2$) based sintering agent in the state of glass, respectively, while Invented Sample G3 and Comparative Sample G3 are the ($xBaO$-$yZrO_2$-$zSiO_2$)-based sintering agent in the state of calcination and the ($xBaO$-$yCaO$-$zSiO_2$)-based sintering agent in the state of glass, respectively.

The ($xBaO$-$yZrO_2$-$zSiO_2$)-based sintering agent in the state of glass was provided by course of weighing the respective components therein, melting at the temperatures of 1300° C.~1400° C., quenching, subjecting to the primary dry milling, and to the secondary milling so as to provide the particle size of 1.0 $\mu$m or less in D100 with the wet milling method using Ethyl alcohol.

TABLE 1

| Kind of Glass | BaO(x) | ZrO2(y) | SiO2(z) | CaO(y) | State of Additive |
|---|---|---|---|---|---|
| Invented Sample G1 | 0.120 | 0.160 | 0.720 | — | Glass |
| Invented Sample G2 | 0.150 | 0.145 | 0.705 | — | Glass |
| Invented Sample G3 | 0.130 | 0.150 | 0.720 | — | Calcination |
| Comparative Sample G1 | 0.310 | 0.07 | 0.620 | — | Glass |
| Comparative Sample G1 | 0.350 | 0.145 | 0.505 | — | Glass |
| Comparative Sample G1 | 0.20 | — | 0.60 | 0.20 | Glass |

The subcomponents were individually weighed to have the ratio shown in Tables 2 and 3 as follows. Then, they were mixed and milled with the wet mixing process using pure alcohol or Ethyl alcohol and the milling process.

In wet mixing and milling, the particle size was preferably to be in a range of 0.3 μm~0.4 μm in D50 and 1.0 μm or less in D100.

The mixed and milled subcomponents were dried at a temperature of 100° C. or higher for 5 hours or longer.

The subcomponents and the sintering agent in the state of glass prepared as described above were added to $BaTiO_3$ of 0.2 μm~0.4 μm particle size, mixed and distributed, so as to obtain the ratio shown in Tables 2 and 3 as follows.

In the processes of mixing and distributing, under the condition that $BaTiO_3$ as a starting material is not milled, they were deagglomerated and distributed to the maximum level with the distributing agent and the solvent which was prepared by mixing toluene and ethanol.

After the distribution process in order to form the sheets, the slurries were provided through mixing with the organic binder added thereto.

In order to remove the bubbles therein and stabilize the slurries, the slurries made as described above were subjected to the aging treatment for a suitable period of time. Then, the slurries were applied onto film to have a thickness of about 4 μm or less, whereby the dielectric sheets were prepared.

After printing the internal electrodes thereon, three hundred or more dielectric sheets were laminated.

Subsequently, the laminated sheets were pressed using the CIP process at a temperature of 80° C.~100° C. and a pressure of 800~1000 kg/cm² for 10~15 minutes and cut to provide the samples.

The samples were subjected to the heat treatment to remove the organic binder and the distributing agent at a temperature of 250° C.~350° C. for 40 hours or longer, and sintered in the sintering furnace capable of adjusting the temperature and the atmosphere under the condition of a sintering temperature shown in Tables 2 and 3 as follows, in which the partial pressure of oxygen is in the range of $10^{-11}$~$10^{-12}$ atm in the sintering atmosphere.

After sintering as described above, the samples were applied with the Cu outer electrodes and sintered on the outer electrodes at 850° C.~920° C.

After completion of sintering on the outer electrodes, as described above, plating was applied to the samples. After a period of time, the electrical properties of the samples were measured. The results are shown in Table 4 as follows.

In Table 4, the dielectric constant and the dielectric loss were measured using a capacitance meter (Agilent, 4278A) at 1 kHz and 1 Vrms. The insulation resistance was measured using a High Resistance meter (Agilent, 4339B) at a rated voltage per 180 second. The temperature coefficient of the dielectric constant was measured on the temperature dependence of the dielectric constant from −55° C. to 125° C. using a TCC (Temperature Coefficient of the Dielectric Constant) meter (4220A test chamber).

TABLE 2

| | On the basis of 100 mole $BaTiO_3$ | | | | | | |
|---|---|---|---|---|---|---|---|
| | | | Sintering agent in the state of glass | | | | Sintering |
| Sample No. | $MgCO_3$ | $Y_2O_3$ | Kind | Added amount | $Cr_2O_3$ | $Mn_2V_2O_7$ | temperature (° C.) |
| Invented Sample 1 | 1.2 | 0.8 | Invented Sample G1 | 1.3 | 0.2 | 0.1 | 1200 |
| Invented Sample 2 | 1.2 | 0.9 | Invented Sample G2 | 1.3 | 0.2 | 0.1 | 1200 |
| Comparative Sample 3 | 1.2 | 0.8 | Comparative Sample G1 | 1.3 | 0.2 | 0.1 | 1200 |
| Comparative Sample 4 | 1.2 | 0.8 | Comparative Sample G2 | 1.3 | 0.2 | 0.1 | 1200 |
| Invented Sample 5 | 1.2 | 0.8 | Invented Sample G1 | 1.3 | 0.2 | 0.1 | 1230 |
| Invented Sample 6 | 1.2 | 0.9 | Invented Sample G2 | 1.3 | 0.2 | 0.1 | 1230 |
| Comparative Sample 7 | 0.8 | 0.4 | Invented Sample G1 | 3.2 | 0.2 | 0.1 | 1230 |
| Comparative Sample 8 | 0.6 | 0.4 | Invented Sample G1 | 3.0 | 0.2 | 0.1 | 1230 |
| Invented Sample 9 | 1.0 | 0.4 | Invented Sample G1 | 1.3 | 0.1 | 0.05 | 1200 |
| Invented Sample 10 | 1.0 | 0.6 | Invented Sample G1 | 1.0 | 0.05 | 0.08 | 1200 |
| Invented Sample 11 | 0.8 | 1.2 | Invented Sample G1 | 1.3 | 0.08 | 0.08 | 1230 |
| Comparative Sample 12 | 0.8 | 0.2 | Invented Sample G1 | 1.3 | 0.0 | 0.08 | 1230 |
| Comparative Sample 13 | 1.3 | 1.3 | Invented Sample G1 | 0.4 | 0.08 | 0.1 | 1200 |
| Invented Sample 14 | 1.2 | 0.7 | Invented Sample G2 | 1.5 | 0.2 | 0.1 | 1230 |
| Invented Sample 15 | 1.3 | 1.0 | Invented Sample G2 | 1.5 | 0.1 | 0.08 | 1230 |
| Invented Sample 16 | 1.3 | 0.8 | Invented Sample G2 | 1.3 | 0.08 | 0.1 | 1230 |
| Comparative Sample 17 | 1.2 | 0.7 | Comparative Sample G3 | 1.3 | 0.2 | 0.1 | 1230 |

TABLE 2-continued

| | On the basis of 100 mole BaTiO$_3$ | | | | | | |
|---|---|---|---|---|---|---|---|
| | | | Sintering agent in the state of glass | | | | Sintering |
| Sample No. | MgCO$_3$ | Y$_2$O$_3$ | Kind | Added amount | Cr$_2$O$_3$ | Mn$_2$V$_2$O$_7$ | temperature (° C.) |
| Comparative Sample 18 | 1.2 | 0.8 | Comparative Sample G3 | 1.5 | 0.08 | 0.05 | 1290 |
| Invented Sample 19 | 1.2 | 0.7 | Invented Sample G3 | 1.3 | 0.2 | 0.1 | 1200 |
| Invented Sample 20 | 1.4 | 0.8 | Invented Sample G3 | 1.5 | 0.08 | 0.1 | 1230 |

TABLE 3

| Sample No. | MgCO$_3$ | Y$_2$O$_3$ | BaSiO$_3$ | ZrO$_2$ | Cr$_2$O$_3$ | Mn$_2$V$_2$O$_7$ | Sintering temperature (° C.)) |
|---|---|---|---|---|---|---|---|
| Comparative Sample 21 | 1.3 | 0.7 | 1.3 | 0.2 | 0.2 | 0.1 | 1200 |
| Comparative Sample 22 | 1.3 | 0.7 | 1.3 | 0.2 | 0.2 | 1.0 | 1290 |

TABLE 4

| Sample No. | Dielectric constant (25° C.) | Dielectric loss (%), 25° C. | Temperature coefficient of the dielectric constant −55° C. | Temperature coefficient of the dielectric constant 85° C. | Insulation Resistance × 10$^9$ Ω | Remarks |
|---|---|---|---|---|---|---|
| Invented Sample 1 | 3010 | 6.82 | −3.7 | −7.8 | 0.96 | Good |
| Invented Sample 2 | 2946 | 7.53 | −2.9 | −11.6 | 0.72 | Good |
| Comparative Sample 3 | 2746 | 12.53 | −1.5 | −13.6 | 0.17 | R1 |
| Comparative Sample 4 | 2567 | 12.78 | — | — | — | R1 |
| Invented Sample 5 | 2910 | 6.47 | −3.9 | −6.4 | 1.06 | Good |
| Invented Sample 6 | 2880 | 5.97 | −3.1 | −10.2 | 1.20 | Good |
| Comparative Sample 7 | 2218 | 17.12 | — | — | — | Over-sinterization |
| Comparative Sample 8 | 2334 | 13.71 | — | — | — | Over-sinterization |
| Invented Sample 9 | 3008 | 6.54 | −3.45 | −12.5 | 0.43 | Good |
| Invented Sample 10 | 3129 | 6.36 | −4.21 | −8.3 | 0.84 | Good |
| Invented Sample 11 | 2764 | 5.84 | −3.75 | −8.1 | 1.14 | Good |
| Comparative Sample 12 | — | — | — | — | — | Semi-conductive |
| Comparative Sample 13 | — | — | — | — | — | Not-sintered |
| Invented Sample 14 | 2987 | 4.12 | −4.43 | −11.5 | 1.09 | Good |
| Invented Sample 15 | 2536 | 3.97 | −4.12 | −13.1 | 1.43 | Good |
| Invented Sample 16 | 2789 | 4.34 | −4.07 | −13.9 | 1.02 | Good |
| Comparative Sample 17 | — | — | — | — | — | Not-sintered |
| Comparative Sample 18 | 2557 | 3.51 | −4.94 | −16.79 | 1.17 | R2 |
| Invented Sample 19 | 2886 | 4.27 | −4.23 | −11.38 | 1.11 | Good |
| Invented Sample 20 | 2812 | 4.23 | −4.97 | −9.97 | 1.23 | Good |
| Comparative Sample 21 | — | — | — | — | — | Not-sintered |
| Comparative Sample 22 | 2661 | 3.98 | −5.14 | −16.42 | 1.06 | R2 |

R1: Sintering property deterioration
R2: Serious short circuit

As shown in Table 4, as for Comparative Sample 3, the amount of BaO of the sintering agent in the state of glass is large while the amount of ZrO$_2$ is small. As for Comparative Sample 4, the amount of BaO is large while the amount of SiO$_2$ is small. As a result, it can be seen that the sintering properties thereof are deteriorated.

Further, as for Comparative Samples 7 and 8, the amount of the sintering agent is large, while the amount of Y$_2$O$_3$ having a tendency of increasing the sintering temperature with the increase of amount is small. As a result, it can be seen that the grain growth is occurred at 1230° C. and that there is a tendency of over-sinterization.

As for Comparative Sample 12, Cr$_2$O$_3$ increasing the reduction resistance is not added and Y$_2$O$_3$ is added in a very small amount to become semi-conductive.

As for Comparative Sample 13, since too small an amount of sintering agent is added to lower the sintering property, the sintering is not achieved.

Both Comparative Samples 17 and 18 use the xBaO-yCaO-zSiO$_2$ as the sintering agent, and are not sintered at 1200° C.~1230° C. Meanwhile, it can be seen that, as for Comparative Sample 18, although it is sintered at 1290° C., the dielectric constant is low and does not satisfy the X5R characteristics at 85° C.

In case of Comparative Samples 21 and 22, ZrO$_2$ is added alone thereto in the form of an oxide. It can be seen that both the effect achieved from the cold sintering and the X5R characteristics at 85° C. are not satisfied.

Meanwhile, it can be seen that Invented Samples 1, 2, 5, 6, 9, 10, 11, 14, 15, 16, 19 and using the dielectric composition in accordance with the present invention show a good property on the materials of a high capacitance for the X5R characteristics.

As described above, the present invention has excellent properties on the dielectric constant and the temperature characteristics of capacitance. Thus, the present invention provides an advantageous effect of providing a dielectric composition suitable to manufacture a multilayer ceramic capacitor of an ultra high capacitance with 2012 (2.0 mm×1.25 mm) or less size.

The present invention also provides an advantageous effects of remarkably reducing short circuits between the electrodes and preventing a deterioration in capacitance due to combining of internal electrodes when manufacturing the multilayer ceramic capacitor of a higher capacitance, being formed to have a thin layer structure of 4 μm or less.

What is claimed is:

1. A dielectric composition for a multilayer ceramic capacitor comprising:

BaTiO$_3$, MgCO$_3$, Y$_2$O$_3$, Cr$_2$O$_3$, Mn$_2$V$_2$O$_7$, and xBaO-yZrO$_2$-zSiO$_2$ which is a sitering additive (where $0.1 \leq x \leq 0.3$, $0.1 \leq y \leq 0.3$ and $0.4 \leq z \leq 0.8$, x+y+z=1);

wherein when representing the composition with the formula $a$BaTiO$_3$-$b$MgCO$_3$-$c$Y$_2$O$_3$-$d$Cr$_2$O$_3$-$e$(Mn$_2$V$_2$O$_7$)-$f$(xBaO-yZrO$_2$-zSiO$_2$), the ratio of the components satisfies the condition of a=100, $0.1 \leq b \leq 3.0$, $0.3 \leq c \leq 2.0$, $0.05 \leq d \leq 0.2$, $0.01 \leq e \leq 1.5$, $0.5 \leq f \leq 3.0$ based on the molar ratio.

2. The dielectric composition as set forth in claim 1, wherein BaTiO$_3$ has a particle size 0.4 μm or less.

3. The dielectric composition as set forth in claim 2, wherein BaTiO$_3$ has a particle size of 0.2 μm~0.4 μm.

4. The dielectric composition as set forth in claim 1, wherein the sintering agent is in a state of glass.

5. The dielectric composition as set forth in claim 1, wherein the sintering agent is in a state of calcination.

6. The dielectric composition as set forth in claim 4, wherein the sintering agent has a particle size of 1 μm or less.

7. A multilayer ceramic capacitor alternately laminated with internal electrodes and dielectric layers, the dielectric layers comprising a dielectric composition for a multilayer ceramic capacitor having the following formula:

$a$BaTiO$_3$-$b$MgCO$_3$-$c$Y$_2$O$_3$-$d$Cr$_2$O$_3$-$e$(Mn$_2$V$_2$O$_7$)-$f$(xBaO-yZrO$_2$-zSiO$_2$)

(where a=100, $0.1 \leq b \leq 3.0$, $0.3 \leq c \leq 2.0$, $0.05 \leq d \leq 0.2$, $0.01 \leq e \leq 1.5$, $0.5 \leq f \leq 3.0$, $0.1 \leq x \leq 0.3$, $0.1 \leq y \leq 0.3$, $0.4 \leq z \leq 0.8$, x+y+z=1 based on the molar ratio).

8. The multilayer ceramic capacitor as set forth in claim 7, wherein the internal electrodes are Ni electrodes.

9. The multilayer ceramic capacitor as set forth in claim 7, wherein each of the dielectric layers has a thickness of 4 μm or less.

10. The multilayer ceramic capacitor as set forth in claim 7, wherein 300 or more of the dielectric layers are laminated.

11. The multilayer ceramic capacitor as set forth in claim 9, wherein 300 or more of the dielectric layers are laminated.

12. A method for manufacturing a multilayer ceramic capacitor, the method comprising the steps of:

printing internal electrodes on dielectric sheets;

laminating the dielectric sheets on which the internal electrodes are printed; and sintering the laminated dielectric sheets, wherein the dielectric sheets comprise a dielectric composition for a multilayer ceramic capacitor having the following formula:

$a$BaTiO$_3$-$b$MgCO$_3$-$c$Y$_2$O$_3$-$d$Cr$_2$O$_3$-$e$(Mn$_2$V$_2$O$_7$)-$f$(xBaO-yZrO$_2$-zSiO$_2$)

(where a=100, $0.1 \leq b \leq 3.0$, $0.3 \leq c \leq 2.0$, $0.05 \leq d \leq 0.2$, $0.01 \leq e \leq 1.5$, $0.5 \leq f \leq 3.0$, $0.1 \leq x \leq 0.3$, $0.1 \leq y \leq 0.3$, $0.4 \leq z \leq 0.8$, x+y+z=1 based on the molar ratio).

13. The method as set forth in claim 12, wherein the internal electrodes are Ni electrodes.

14. The method as set forth in claim 12, wherein each of the dielectric sheets has a thickness of 4 μm or less.

15. The method as set forth in claim 12, wherein 300 or more of the dielectric sheets are laminated.

16. The method as set forth in claim 12, wherein the sintering temperature is 1170° C.~1230° C. and the partial pressure of oxygen in the sintering atmosphere is in a range of $10^{-11}$~$10^{-12}$ atm.

* * * * *